United States Patent
Redwine et al.

[11] Patent Number: 5,618,373
[45] Date of Patent: Apr. 8, 1997

[54] APPARATUS FOR FORMING EXTRUDED FILAMENT MAT MATERIAL

[75] Inventors: Stephen J. Redwine; David K. Oaks, both of Knoxville, Tenn.

[73] Assignee: Plastic Floor Mats Inc., Clinton, Tenn.

[21] Appl. No.: 421,804

[22] Filed: Apr. 13, 1995

Related U.S. Application Data

[62] Division of Ser. No. 143,273, Oct. 26, 1993, Pat. No. 5,456,876.

[51] Int. Cl.$^6$ ............ D04H 3/16; B29C 47/34; B29C 47/88; B29C 47/92
[52] U.S. Cl. ............ 156/361; 156/441; 156/497; 156/498; 425/83.1; 425/223
[58] Field of Search ............ 156/167, 244.11, 156/62.2–62.6, 181, 433, 436, 441, 361, 497, 500, 498, 381; 264/555, 556; 425/83.1, 223; 19/296, 299, 304–308

[56] References Cited

U.S. PATENT DOCUMENTS

| | | |
|---|---|---|
| Re. 31,599 | 6/1984 | Rasen et al. . |
| 2,729,028 | 1/1956 | Slayter et al. . |
| 3,010,865 | 11/1961 | Porter . |
| 3,314,122 | 4/1967 | Bundy ............ 156/62.4 X |
| 3,314,840 | 4/1967 | Lloyd et al. ............ 156/441 X |
| 3,441,468 | 4/1969 | Siggel et al. . |
| 3,686,049 | 8/1972 | Manner et al. . |
| 3,704,192 | 11/1972 | Soehngen et al. ............ 156/167 |
| 3,708,565 | 1/1973 | Seiffert . |
| 3,972,759 | 8/1976 | Buntin . |
| 4,013,816 | 3/1977 | Sabee et al. . |
| 4,021,281 | 5/1977 | Pall . |
| 4,212,692 | 7/1980 | Rasen et al. . |
| 4,217,387 | 8/1980 | Viezee et al. ............ 156/167 X |
| 4,351,683 | 9/1982 | Kusilek . |
| 4,855,179 | 8/1989 | Bourland et al. . |
| 5,055,151 | 10/1991 | Duffy . |
| 5,366,793 | 11/1994 | Fitts, Jr. et al. ............ 156/167 X |

FOREIGN PATENT DOCUMENTS

| | | | |
|---|---|---|---|
| 53-19705 | 6/1978 | Japan ............ | 156/167 |
| 54-8790 | 4/1979 | Japan ............ | 156/167 |
| 55-8623 | 3/1980 | Japan ............ | 156/167 |

*Primary Examiner*—Adrienne C. Johnstone
*Attorney, Agent, or Firm*—Luedeka Neely & Graham P C

[57] ABSTRACT

A multiplicity of closely spaced thermoplastic polymer filaments are extruded from an elongated orifice plate through a draft protected free-fall zone onto a rotating cylinder surface, landing between about 30° before and after upper dead center of rotation. Filament extrusion velocity and cylinder rotational velocity are coordinated to pile the filament into a mat continuum of accumulated filament laps. Filament temperature and viscosity are coordinated to provide thermoplastic bonding at the filament lap crossings to integrate the continuum. The rotating cylinder carries the matted continuum over an arc of about 150° to 210° to about lower dead center of rotation where the mat peels from the cylinder surface. After separation from the cylinder surface, the mat is supported by a transitional air jet on to a horizontal run surface of a traveling endless belt for consolidated support until the lap crossing bond joints are securely set.

8 Claims, 2 Drawing Sheets

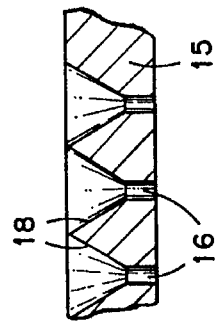
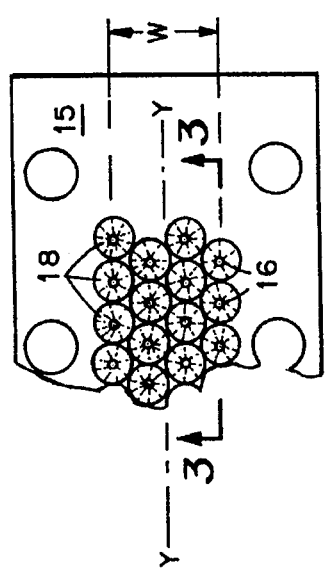
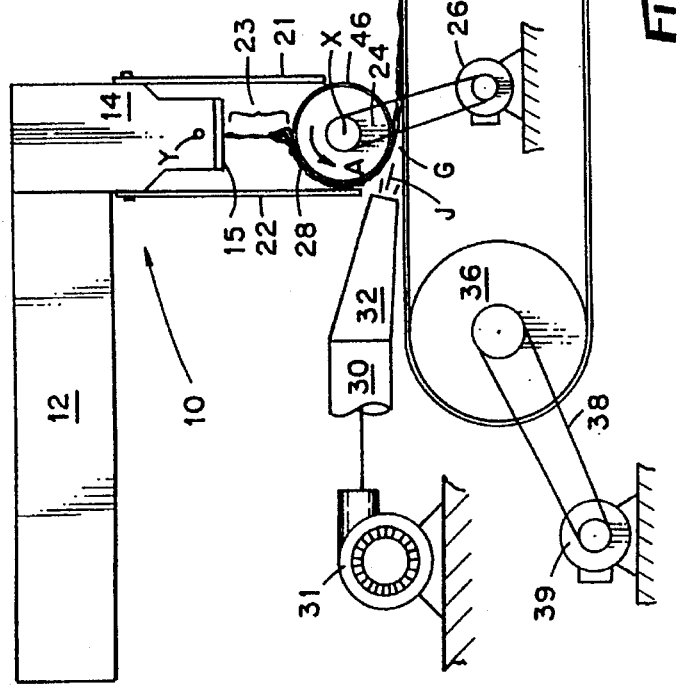

APPARATUS FOR FORMING EXTRUDED FILAMENT MAT MATERIAL

This is a division of application Ser. No. 08/143,273, filed Oct. 26, 1993 now U.S. Pat. 5,456,876.

BACKGROUND OF THE INVENTION

This invention relates to a method and apparatus for making a matted continuum of continuously extruded filaments. More particularly, the invention relates to a method and apparatus for controlling the piled accumulation of filament to produce a matted continuum.

Open pore mats have been produced by a process which includes the extrusion of a multiplicity of molten thermoplastic polymer filaments over a short free-fall distance against a rotating cylinder at shallow contact angles. These filaments loop, pile and randomly lay into an accumulated continuum of a relatively uniform thickness that is bonded at the contact points of lap crossing to form a continuously developing mat on the rotating surface which is immediately quenched in a water bath.

Polymeric materials suitable for fabricating such piled mats include polyvinyl chloride, polypropylene, polyethylene, thermoplastic elastomers and other recyclable thermoplastic resins which are extrudable at elevated temperatures in the form of soft, flexible, continuous filaments and which at lower temperatures have the required stiffness, toughness and other physical and chemical characteristics to permit cohesion of the filaments.

Matting materials of this description have utility in such widely diverse applications as outdoor carpeting, underlayment for indoor and outdoor carpeting, soil retention matting and electrical cable splicing molds.

Other known processes for open pore mats of this type extrude the filaments onto a moving support and compress the filament bed in a nip.

The quench bath method is undesirable in several respects, particularly the fact that it requires an additional drying step. The compression method has an undesirable flattening effect on the filaments adjacent the surfaces of the filament bed.

It is, therefore, an object of the present invention to provide a process and apparatus for fabricating continuous filament polymer matting.

It is another object of the present invention to provide a process and apparatus for fabricating continuous filament polymer matting that requires no post-fabrication drying procedures.

Another object of the present invention is to provide a process and apparatus of the character described which enables improved control over the loft, or bulkiness of a continuous filament polymer mat.

A still further object of the present invention is to provide a process and apparatus of the character described for regulating the density, thickness and surface characteristics of a continuous filament polymer mat.

SUMMARY OF THE INVENTION

Having regard to the above and other objects and advantages, the present invention is directed to a process for making a porous resilient mat of interbonded polymeric filaments. In general, the process comprises extruding along an extrusion line at an extrusion velocity a multiplicity of continuous polymer filaments near the rotational top of a casting cylinder which is rotatably driven at a rate coordinated to the filament extrusion velocity about an axis generally parallel to the extrusion line to cause looping of filaments on the cylinder to develop the desired mat thickness. The accumulated mat is carried by the cylinder surface to about lower dead center where it is peeled from the drum surface and gently transferred onto an endless belt at a cylinder-to-belt transfer line for extended support while cooling and curing. A high volume air jet is discharged between the mat and the belt generally in the direction of movement of the belt adjacent the cylinder-to-belt-transfer line to provide an air-lift effect for transitional support and product lofting. To reduce the length of the support belt conveyor, additional cooling air flow may be provided along the belt traveling course. Due to the openness of the mat structure it is necessary to protect the filament free-fall from strong drafts originating from the high volume jet. Such draft protection preferably takes the form of baffle plates supported adjacent the extrusion head and extending down to close proximity with the cylinder and mat surface, respectively. The baffle plates minimize undesirable air flow into the area of the filaments falling onto the cylinder so that accumulation of the filaments on the cylinder is not disaffected by the air lift imported by the air jet.

BRIEF DESCRIPTION OF THE DRAWINGS

The above and other features and advantages of the invention will become further known from the following detailed description of preferred embodiments of the invention in conjunction with the accompanying drawings in which:

FIG. 1 is a diagrammatic view in elevation of an apparatus for making a continuous filament polymer mat illustrating features of a preferred embodiment of the process and apparatus of the invention.

FIG. 2 is a partial plan view of an extruder orifice plate for use in the invention illustrating the extrusion aperture distribution pattern.

FIG. 3 is an enlarged sectional view of the orifice plate of FIG. 2.

DESCRIPTION OF THE PREFERRED EMBODIMENT

Figure 4:
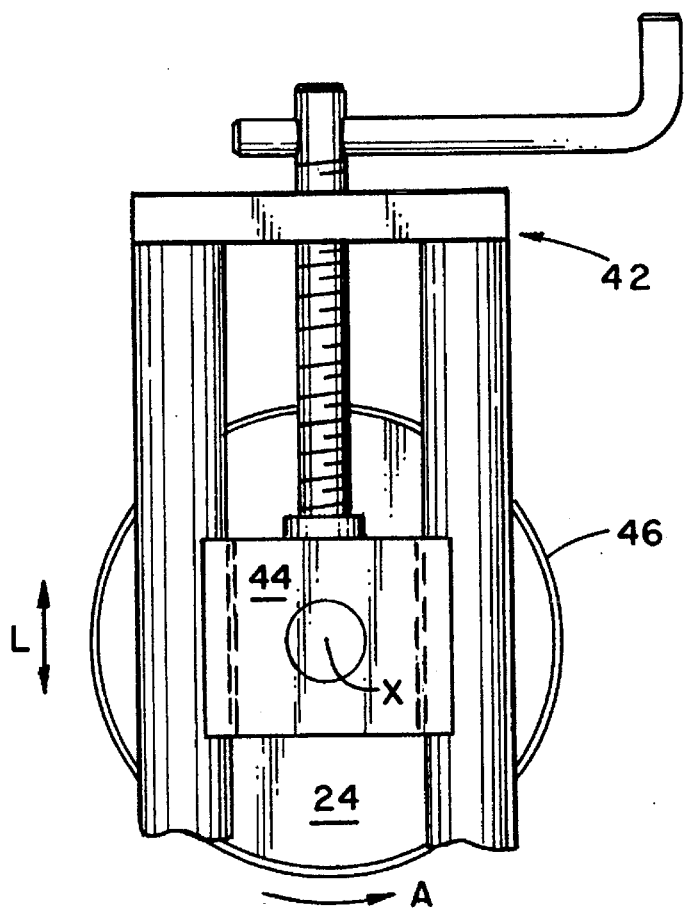
FIG. 4 is an elevational view of a filament free-fall distance adjusting mechanism for use in the invention.

Referring now to the drawings in which like reference characters designate the same or similar parts throughout the several views, an apparatus 10 for producing a continuous filament polymer mat according to a preferred embodiment of the invention is shown in FIG. 1. The apparatus 10 includes a raw material loading system such as hopper 11 to supply pelletized or crumb polymer to a heating barrel 12 where it is melted to a viscous liquid above 325° F., depending on the particular thermoplastic compound. A powered screw mechanism within the barrel 12 forces the melted plastic through an adapter into an elongate die block 14.

The lower face of the die block 14 includes an orifice plate 15 perforated by a multiplicity of closely spaced orifices 16, best illustrated by FIG. 2, from which respective filaments 20 are extruded into an adjustable free-fall zone 23 preferably of about one to about four inches height. Orifices as small as 0.012 in. and as large as 0.026 in. have been successfully used. As noted from FIG. 3, orifice lead-in fairing cones 18 are provided to reduce flow resistance of the viscous melt into the orifice apertures. The total band width W of the orifice pattern may be about 1 in, each orifice row being separated by about one-quarter inch for a total of 4 rows. As seen in FIG. 2, the rows are preferably staggered at ½ spacing between the orifices of adjacent rows.

A casting cylinder 24 having an independent rotational drive means 26 such as a variable speed electric motor is adjustably aligned beneath the extrusion plate 15 to receive the free-falling filaments 20 at about 30 degrees either side of a rotational top dead center. The cylinder is rotatably driven on a suitable support (see, e.g. FIG. 4) for rotation in the direction of arrow A about a rotational axis X which is preferably parallel to and vertically beneath the length axis Y of die block 14, both axes X and Y coming out of the page as viewed in FIG. 1.

By means such as a manual jack-screw mechanism 42, as shown by FIG. 4, for vertically adjusting the position of journal blocks 44 and associated adjustment mechanism 45 in the direction indicated by arrow L, the vertical free-fall distance of extruded filaments between the orifice plate 15 and the top dead centerline of casting cylinder 24 may be adjusted.

Structurally, the casting cylinder 24 is preferably provided by a hollow steel shell of about four to about 5 inches diameter. A rough textured surface to the casting cylinder 24 corresponding to a coarse finishing grit is preferred for securing the hot mat-to-cylinder interface as it approaches 9 o'clock or the 90° position. A suitable means for such texture has been a wrap 46 of the cylinder 24 surface along its functional length with 80-grit emory cloth, sandpaper or vinyl stairtread material of about 80 durometer. It should be noted, however, that the invention has been successfully practiced on a bare steel roll surface, also.

Figure 5:
FIG. 5 is a plan view of a mat formed by the present invention.
Figure 6:
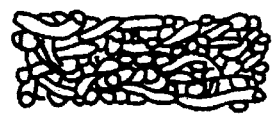
FIG. 6 is a fragmented cross-sectional view of the mat material of FIG. 5.

The cylinder 24 rotational speed is coordinated with the filament 20 extrusion velocity to accumulate, develop and issue a moving bed or continuum 28 of randomly looped piles on the cylinder surface. A static body or bed of this continuum may be characterized as a mat. The FIG. 5 illustration represents a plan view of such a mat. A cross-sectional cut of the mat 28 is shown by FIG. 6.

Many variables contribute to the mat 28 properties and characteristics. The polymer material selected for extrusion from a particular extrusion machine 10 will predominantly determine the extrusion temperature and velocity. Polyvinyl chloride is preferably extruded over a temperature range of about 300° F. to about 325° F. Thermoplastic elastomers, however, are preferably extruded over a range of about 350° F. to about 375° F. To a lesser degree, the extruder equipment 10 and the size of the orifice plate apertures 16 influence the filament 20 velocity. For example, smaller filaments would be expected to cool more quickly and, thus, the distance between the extruder and cylinder 24 may generally be reduced as the filament diameter is reduced.

Aside from the material selection, important mat control parameters are the rotational velocity of the casting cylinder 24, the filament free-fall distance 23 and the exact filament landing location within the general arc of about 60 degrees including 30 degrees before and after rotational top dead center.

As the multiple filaments engage the cylinder 24 surface, the strands collapse to lap, loop and overlay in an entwined pile compressed only by their weight. Downward advancement of the piled continuum on the moving drum limits the pile depth and density as well as weight compression effects. When issued from the die plate 15, the material body temperature of each filament is about 300° F. to 375° F. At this temperature each filament lap crossing fuses and bonds to form a network of inter-bonded joints which, collectively, integrate the piled continuum into a unitized mat. Lap bonds formed between filaments cooled below 300° F. are frequently weak and unreliable. Thus, free-fall height may be adjusted to control cooling of the filaments and, hence, ensure the necessary degree of filament interbonding in the resulting mat.

Rotation of the cylinder 24 carries the matted continuum 28 against the cylinder surface over an arc of from about 150° to about 210°. At or near the lower dead center position of the cylinder 24, the mat peels from the rough textured drum surface to land upon an upper horizontal run of a support web preferably provided by an endless belt 34 coursed between an idle roll 37 and a drive roll 36. The drive roll is rotatively driven as by chain 38 from a variable speed power source 39. It is noted especially that cylinder 24 in the preferred embodiment is supported in spaced relation above the belt 34 so that the mat is not compressed between the cylinder and the belt. Most preferably, cylinder 14 is spaced sufficiently above the belt 34 to provide a small gap G between the mat 28 and the belt adjacent the location at which the mat pays off the cylinder; about 1 inch, for example. Into the gap G and widthwise along the mat 28 transfer region between the lower dead center of cylinder 24 and the upper run surface of belt 34, a jet J of air is discharged generally parallel to the traveling direction of the mat from an elongated nozzle 32 projected from air manifold 30 and supplied by a variable speed/variable volume blower 31. Preferably, the air in jet J is about ambient temperature, i.e., about 70° to 80° F.

The air jet J from nozzle 32 has a significant effect on the properties of a resulting mat. A strong air flow volume and velocity tends to accelerate expansion and cooling of the mat structure for greater loft and thickness. Long filament free-fall distances also tend to form thicker, lighter mats with long radius loops. Conversely, a small filament free-fall distance tends to form a thinner, denser mat with short radius loops. Little or no air flow in gap G tends to enable generation of more dense mats with increased filament flattening adjacent the belt/mat interface as the filaments cool and harden more slowly on the advancing belt. The physical data of Table 1 illustrates the operative scope of such operational variations and their effect on mat thickness and corresponding void volume percentage.

TABLE I

| Sample Number | Length | Width | Thickness | Volume (cu in) | Volume Cu Cm | Displacement (Cu Cm) | Void Volume (%) |
| --- | --- | --- | --- | --- | --- | --- | --- |
| Heavy Duty #1 | 6.000 | 1.570 | 0.422 | 3.975 | 65.143 | 15 | 77.0 |
| Heavy Duty #2 | 6.036 | 1.510 | 0.420 | 3.828 | 62.730 | 18 | 71.3 |
| Heavy Duty #3 | 6.046 | 1.575 | 0.423 | 4.028 | 66.007 | 17 | 74.2 |

TABLE I-continued

| Sample Number | Length | Width | Thickness | Volume (cu in) | Volume Cu Cm) | Displacement (Cu Cm) | Void Volume (%) |
| --- | --- | --- | --- | --- | --- | --- | --- |
| Heavy Duty #4 | 6.017 | 1.560 | 0.419 | 3.933 | 64.450 | 18 | 72.1 |
| Standard Wt #1 | 6.045 | 1.540 | 0.297 | 2.765 | 45.308 | 15 | 66.9 |
| Standard Wt #2 | 6.010 | 1.550 | 0.306 | 2.851 | 46.712 | 15 | 67.9 |
| Standard Wt #3 | 6.015 | 1.540 | 0.305 | 2.825 | 46.297 | 13 | 71.9 |
| Standard Wt #4 | 6.065 | 1.542 | 0.299 | 2.796 | 45.823 | 16 | 65.1 |

Due to the porous, open structure of the mat 28, air flow from the nozzle 32 may penetrate the mat and follow the cylinder 24 surface up to the filament 20 landing zone. Similarly, spillover air from the nozzle 32 may attach to the cylinder carried mat and rise to the filament 20 landing zone. To prevent the adverse consequences of air drafts originating from the nozzle 32 air supply, vertically adjustable air screens or baffles 21 and 22 may be secured to the die block 14 to screen the filament free-fall zone 23.

Length of the belt 34 between the drive and idle rolls is preferably sufficient to provide a complete cure and cooling of the filament joints upon reaching the belt end. However, a supplemental source of cooling air as at 40 may be provided for unusually dense mats or, due to floor space limitations, a belt 34 of insufficient length. Such supplemental cooling air source may be a duct supplied manifold or an array of high-capacity fans. By whatever cooling means the completed mat must have cooled sufficiently by the end of belt 34 run length to leap an unsupported gap into a powered winding stand 48 for wrapping the mat continuum into a shipping or handling roll 50, and to wrap without significant interadherance of adjacent layers.

Having fully described my invention, we claim:

1. An apparatus for the manufacture of a porous, resilient mat comprising:

a thermoplastic polymer extrusion means for extruding a plurality of closely spaced filaments of viscous polymer through a short vertical free-fall distance;

a rotatively driven casting cylinder disposed beneath said extrusion means to receive said plurality of filaments as a landing surface along a first elongated arc of cylindrical surface elements within about 30° of a top dead center rotational position of said cylinder;

cylinder rotational speed-control means to coordinate said cylinder surface speed to the extrusion velocity of said polymer filaments whereby a looping and lapping accumulation of said filaments on said rotating cylinder surface develops a mat continuum of predetermined thickness, said mat continuum being supported by said cylindrical surface to about the lower dead center position of cylinder rotation;

endless belt traveling surface support means for receiving said mat continuum upon separation from said rotating cylinder at about said lower dead center position; and, air jet discharge means for directing a jet of air between said mat continuum and said endless belt traveling surface support means along a direction generally parallel with said endless belt traveling surface support means.

2. An apparatus as described by claim 1 wherein said endless belt traveling surface support means is spaced below said cylinder by a distance greater than the thickness of said mat continuum.

3. An apparatus as described by claim 1 wherein said air jet discharge means directs said jet of air between said mat continuum and said endless belt traveling surface support means about where said mat continuum separates from said cylinder surface.

4. An apparatus as described by claim 3 further comprising air volume control means to regulate the volume of said air jet discharge.

5. An apparatus as described by claim 1 further comprising draft screen means secured to said extrusion means for isolation of said vertical free-fall distance from ambient drafts.

6. An apparatus as described by claim 1 further comprising casting cylinder displacement means to adjust the vertical length of said free-fall distance.

7. An apparatus as described by claim 1 wherein said free-fall distance is within about 1 inch to about 4 inches.

8. An apparatus as described by claim 1 further comprising supplemental air flow means directed against said mat continuum near a delivery end of said endless belt traveling surface support, means for additional mat continuum cooling capacity.

* * * * *